July 19, 1949.    R. W. EPLER    2,476,484
BRAKE GAUGE
Filed June 2, 1947    2 Sheets-Sheet 1

Inventor
Raymond Warren Epler
By R. S. Berry
Attorney

July 19, 1949.　　　　　R. W. EPLER　　　　　2,476,484
BRAKE GAUGE

Filed June 2, 1947　　　　　　　　　　　　　　2 Sheets-Sheet 2

Inventor
Raymond Warren Epler

By

Attorney

Patented July 19, 1949

2,476,484

UNITED STATES PATENT OFFICE 2,476,484

BRAKE GAUGE

Raymond Warren Epler, Inglewood, Calif.

Application June 2, 1947, Serial No. 751,675

6 Claims. (Cl. 33—180)

This invention relates to automobile brake gages.

One of the objects of this invention is to provide a brake gage of the character described which is simple as to construction, small, compact and reliable and accurate in operation for determining drum irregularities and centering brake shoes of all types of present day motor vehicle brakes.

Another object of this invention is to provide a brake gage of the character described which may be quickly and positively centered on brake drums of standard size or which have been worn oversize, then without further adjustment readily and easily applied and operated to center the brake shoes for the purpose of setting the shoes with proper clearance of the lining from the particular drum whether the latter is of standard size or has been worn oversize.

Figure 1:
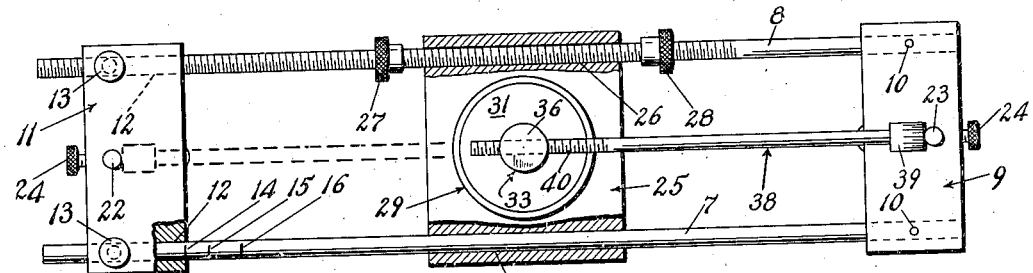
Figure 2:
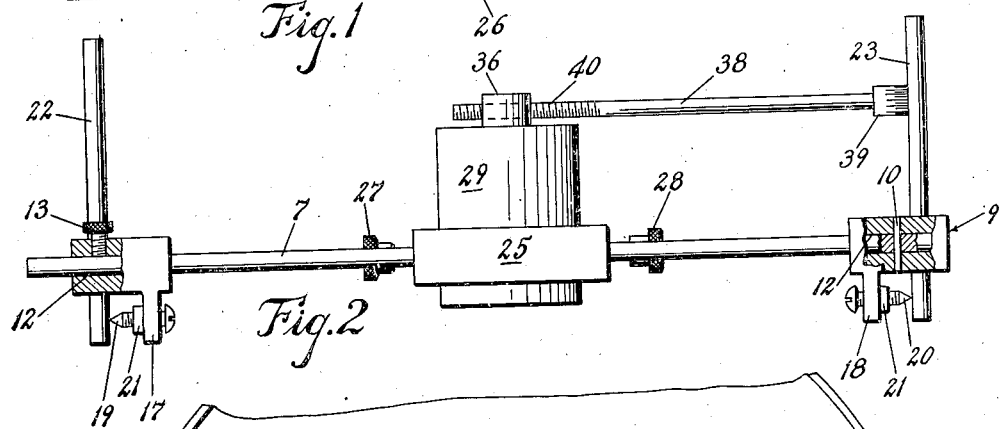
Figure 3:
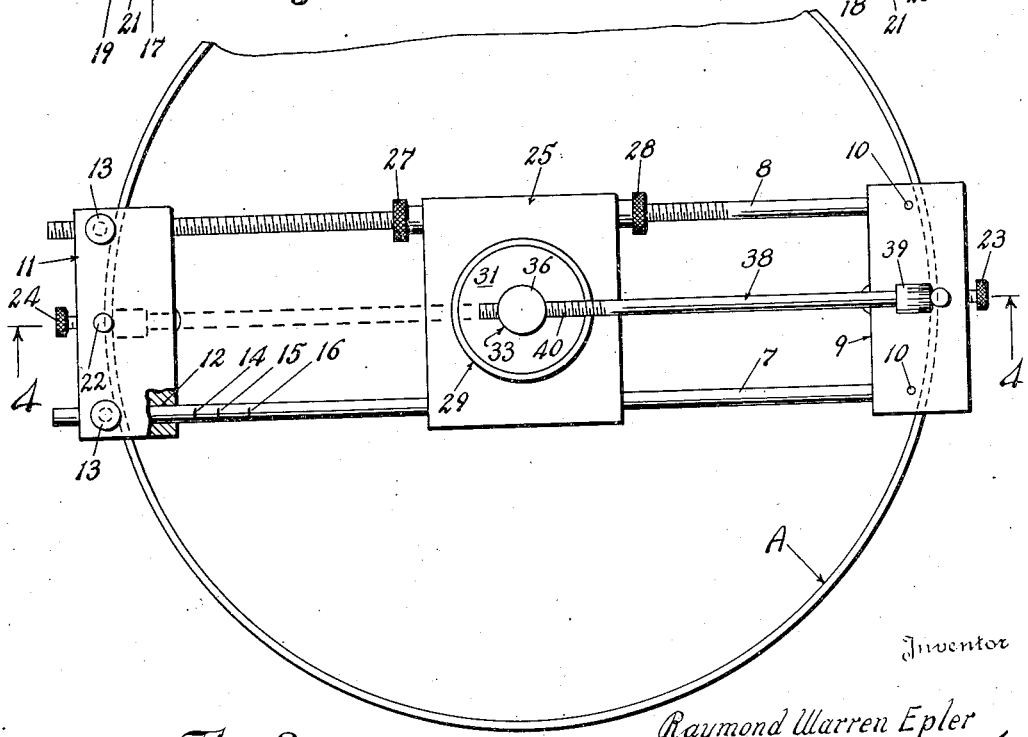
Figure 4:
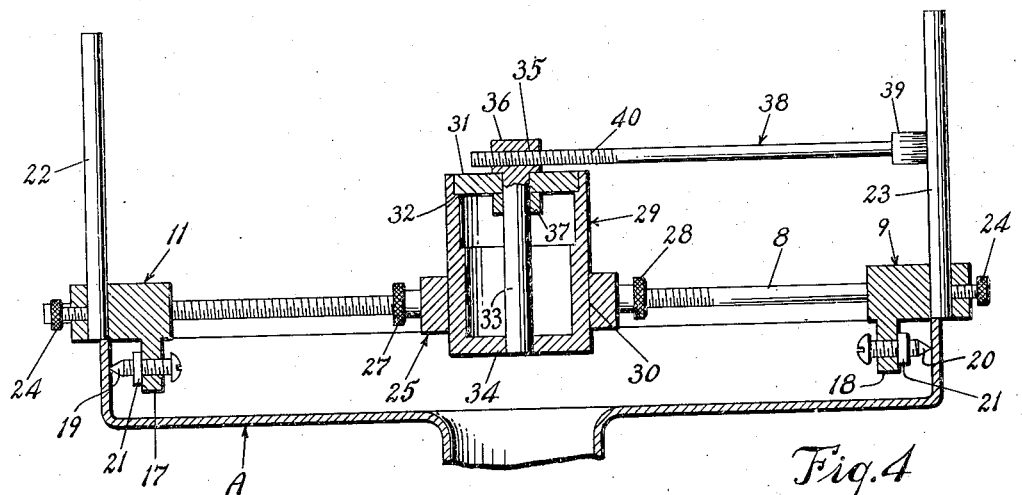
Figure 5:
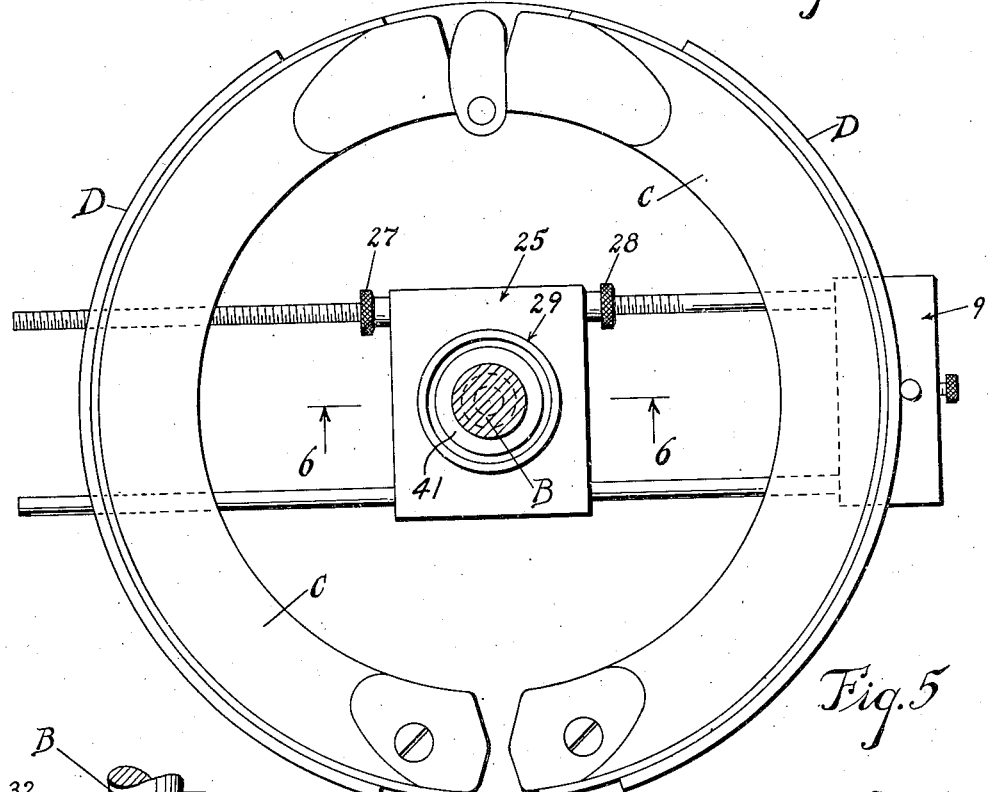
Figure 6:
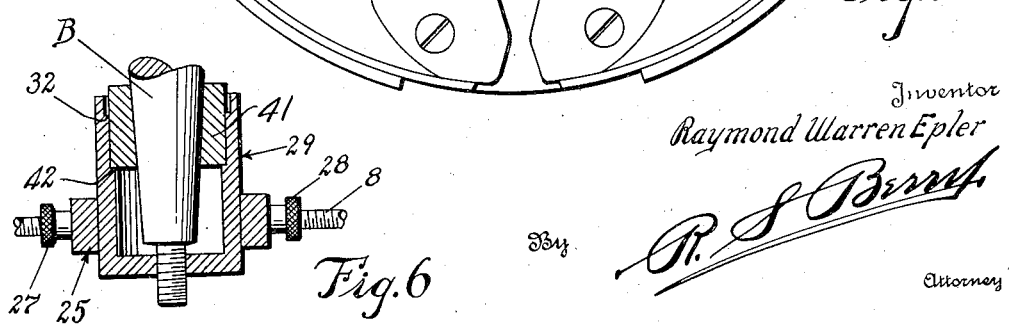

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a top plan view of a brake gage embodying the present invention with parts broken away and shown in section, Fig. 2 is a side elevation of the brake gage with parts broken away and shown in section, Fig. 3 is a top plan view of the gage as when applied to a brake drum, Fig. 4 is a longitudinal sectional view taken on the line 4—4 of Fig. 3, Fig. 5 is an elevational view of the gage as when used to center the brake shoe, and Fig. 6 is a fragmentary sectional view taken on the line 6—6 of Fig. 5.

As shown in the accompanying drawings my improved gage includes a pair of guide rods 7 and 8 to corresponding ends of which a stationary gage block 9 of rectangular form is fixed by means of the pins 10. A similar gage block 11 having transverse bores 12 through which the rods 7 and 8 extend, is slidable on said rods between the other ends of the rods and the block 9. Set screws 13 provide for setting the adjustable block 11 in adjusted positions, there being gage marks 14, 15 and 16 on the rod 7 indicative of the diameter of three standard sizes of brake drums to facilitate a setting of the gage block 11 accordingly. The block 11 is preferably removed from the rods 7 and 8 when the gage is used as will be hereinafter described to center the brake shoes.

Depending from the blocks 11 and 9 are lugs 17 and 18 in which are supported for axial adjustment, like diametrically opposite gage pins 19 and 20. These pins are screw threaded and have pointed outer ends adapted to contact the inner surface of the flange of a brake drum A while the blocks 9 and 11 rest on the edge of the drum flange as shown in Figs. 3 and 4. Nuts 21 on the pins 19 and 20 provide for holding the pins in proper position. The adjustment of the pins is provided for to compensate for wear on the points thereof and to make it possible to initially set the pins in proper position.

Gage posts 22 and 23 are vertically adjustably mounted in vertical bores in the blocks 11 and 9 respectively, being adapted to be held in desired positions by means of the set screws 24. These posts are positioned so that they are diametrically opposite and the distance between them is equal to the distance between the gage pins 19 and 20. In setting the gage pins, the posts are lowered to extend opposite the pins as shown in Fig. 2 and the pins are adjusted and set with their pointed ends contacting the posts after which the posts are vertically adjusted and set so that their lower ends are above the plane of the lower side of the blocks 9 and 11 or flush with said lower side as shown in Fig. 4 so as not to interfere with the drum centering operation as indicated in Figs. 3 and 4. Thus, the distance between the posts is the same as the distance between the outer ends of the gage pins in all diameter readings made with said pins, and said posts therefore afford a centering of the drum as well as the centering of the brake shoes as will be hereinafter fully described.

Mounted to slide back and forth on the rods 7 and 8 between gage blocks 9 and 11 is a substantially square centering block 25 which has smooth bores 26 extending through it for the rods 7 and 8. The rod 8 is screw threaded and has locking nuts 27 and 28 turnable thereon for contact with opposite sides of the block 25 so that the block may be held in accurately centered position.

A cylindrical bearing cup 29 is extended through a central opening 30 in the centering block 25 being sweated, press fitted or otherwise fixed in said opening. A bearing disk 31 is removably fitted in a seat 32 therefor at the upper end of the cup 29 for reception of a pivot pin 33 which also has a bearing in the bottom 34 of the cup. This pivot pin extends upwardly through the bearing disk 31 and has a screw threaded bore 35 in a head 36 on the upper end of the pin. A collar 37 is fixed on the pin so that the disk and pin are removable and replaceable as a unit. A horizontal centering arm 38 is axially adjustably and rotatably supported by means of the pivot pin 33 so that a micrometer head 39 on the outer end of the arm may be swung around between the posts 22 and 23 in the operation of centering the gage in the brake drum. The arm 38 has a screw threaded portion 40 which is turned in the screw threaded bore 35 in the head 36 of the pin 33 whereby the arm may be axially adjusted in the centering operation of the gage. The graduations on the micrometer head 39 are read against the center of the post 22 or post 23 as the case may be to determine the amount of movement of the arm 38. As the operator will look down on the head 39 and particular gage post at which the head 39 is located, in reading the graduation on the head, it is apparent that the center of the post serves as a reference point or index against which the graduations may be quickly read.

Figs. 5 and 6 show how a suitable adapter sleeve 41 is placed on the wheel spindle B as a bearing for the cup 29 when the pin 33, disk 31 and arm 38 are removed and the gage is used to center the brake shoes C so that the brake lining D may be given the proper clearance from the drum A. The outer end of the adapter seats on a shoulder 42 within the cup 29.

Operation

The gage is placed upon the drum as shown in Fig. 4, with the fixed block 9 resting on the drum while the outer end of the gage pin 20 bears against the drum flange. The slide block 11 is now moved outwardly to bring the gage pin 19 against the drum flange. If the inner edge of the slide block 11 when said block is in this position comes in registry with the one of the markings 14, 15 and 16 on the rod 7, which marking indicates the original inside diameter of the particular drum under test, the set screws 13 are tightened to set the block 11.

The center block 25 is now released for free sliding movement by backing away the nuts 27 and 28 and the operator then swings the arm 38 and axially adjusts it while sliding the block 25 until the head 39 fixed on the arm will contact the posts 22 and 23 alike, thus centering the block 25 which is then set in centered position by screwing the nuts 27 and 28 back against such block.

If the block 11 is out of registry with the particular marking on the rod 7 for example the marking 14, as shown in a greatly exaggerated manner in Fig. 3, when the initial application of the gage pins 19 and 20 is made, this indicates wear of the drum beyond its normal or original diameter and that a different manipulation of the gage is necessary to center the block 25. In this centering operation the block 11 is moved from the extended position in which pin 19 contacts the drum flange, back to a position in which the block registers with the proper diameter-indicating mark on the rod 7 (for example the mark 14), and the set screws 13 are tightened to set the block. The operator now centers the block 25 in the manner first above noted. Next the block 11 is released and moved back to the position in which the pin 19 contacts the drum for example as shown in Fig. 3, then the arm 38 is swung to bring the head 39 opposite the post 22, the head 39 being then spaced inwardly from said post. The micrometer reading on the top of the head 39 is noted and the head is turned to axially extend the rod 38 sufficiently to contact the post 22 while noting the micrometer reading as indexed from the center of the post, to compute the extent, for example in thousandths of an inch that the drum is off its original diameter. Assuming that the micrometer reading shows the drum as being twenty thousandths oversize then the operator turns the head 39 back one-half that amount to retract the arm 38 one-half of the distance it was extended to contact post 22, in other words, ten thousandths of an inch and the block 25 is then moved toward the post 22 until the head 39 again contacts the post thereby centering the block 25 with respect to the particular oversized drum. The arm 38 may be swung around to contact post 23 to check the correctness of this centering operation and should contact both posts alike. The block 25 is now set in centered position by means of the nuts 27 and 28. The bearing disk 31 with the pin 33 and arm 38 are now removed from the cup 29 and preferably the block 11 is removed thereby preparing the gage for application to the axle spindle to center the brake shoes as shown in Figs. 5 and 6. The removal of the block 11 makes it easier to apply the gage for centering the brake shoes.

The adapter sleeve 41 is now placed on the spindle B as shown in Fig. 6 and the cup 29 is fitted onto the adapter sleeve so that the gage may be freely rotated to bring the post 23 on the block 9 into position to circumscribe the brake lining D on the shoes C. By swinging the gage in this manner and noting the spacing of the post 23 as it is moved over the outer surface of the brake lining on the shoes, it is possible to readily determine the proper setting of the brake shoes to provide for the proper heel and toe clearances of the shoes.

The shoes are then adjusted as necessary to provide proper centering and clearance as ascertained by the gage for the particular drum, whether the latter is of standard diameter or is worn oversize. If it is necessary to apply shims to the shoes, the micrometer readings ascertained in centering the gage on oversized drums makes it possible to accurately shim up the shoes.

It will now be seen that my improved gage may be readily and easily operated to center standard and oversize drums in a positive and accurate manner and then applied without further centering adjustment to as readily center the brake shoes for the particular drum.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a brake gage, a pair of parallel guide rods, a stationary gage block fixed to corresponding ends of said rods, an adjustable gage block slidable on said rods toward and away from said stationary block, gage pins on said blocks in diametrically opposed relation to one another having corresponding ends disposed to contact opposite points on the inner side of the flange of a brake drum while said blocks rest on said flange, an upstanding gage post carried by each of said blocks, said posts having their opposed surfaces spaced apart a distance equal to the distance between said ends of said pins, a center block slidable on said rods, means for releasably locking said center block in adjusted position, means for releasably locking said adjustable gage block in adjusted position, a bearing cup fixed on said center block, a gage arm and means rotatably supporting said arm in said cup for swinging movement between said posts, including means for axially adjusting said arm on the turning thereof about its own axis, said last named means and said arm being removable from the gage whereby said cup may be rotatably mounted on an axle spindle for moving said posts over the brake shoes to effect a proper setting of the shoes in accordance with the setting of the gage posts.

2. In a brake gage, a pair of parallel guide rods, a stationary gage block fixed to corresponding ends of said rods, an adjustable gage block slidable on said rods toward and away from said stationary block, gage pins on said blocks in diametrically opposed relation to one another having corresponding ends disposed to contact opposite points on the inner side of the flange of a brake drum while said blocks rest on said flange, an upstanding gage post carried by each of said blocks, said posts having their opposed surfaces spaced apart a distance equal to the distance between said ends of said pins, a center block slidable on said rods, means for releasably locking said center block in adjusted position, means for releasably locking said adjustable gage block in adjusted position, a bearing cup fixed on said center block, a gage arm and means rotatably supporting said arm in said cup for swinging movement between said posts, including means for axially adjusting said arm on the turning thereof about its own axis, the outer end of said arm having graduations thereon subject to being indexed from the center of either of said gage posts to indicate the extent of axial adjustment of the arm necessary to bring said end into like contact with said posts to center said center block relative to the brake drum, said adjustable gage block being removed from said rods and said arm and the supporting means therefor being removed after centering said center block; said cup being constructed and arranged to be applied to an axle spindle so that the gage may be turned thereon to bring the post on said stationary block into gaging relation to the brake shoes of the brake unit being tested.

3. In a brake gage, a stationary gage block, a pair of spaced parallel guide rods having corresponding ends fixed to said block, an adjustable gage block slidably mounted on said rods, gage pins mounted on the undersides of said blocks with corresponding ends disposed to contact diametrically opposite points on the inner surface of the flange of a brake drum while said blocks rest on the outer edge of said flange, set screws for setting said adjustable block in adjusted positions, said blocks having vertical bores therein, upstanding gage posts adjustably mounted in said bores, said posts being spaced apart a distance equal to the distance between said ends of said pins, said posts being extensible below said blocks, means adjustably supporting said pins on said blocks whereby said pins may be adjusted so that said ends thereof will contact said posts when the latter are extended below the blocks thereby to set said pins and posts in corresponding gaging positions after which the posts are extended above said pins, set screws for setting said posts above said pins, a center block slidable on said rods, means for releasably locking said center block in centered position on said rods, a gage arm, a pivot member rotatable on said center block and removable therefrom, said pivoted member having a screw threaded transverse bore, said gage arm being screw threaded and turned in said bore in said pivot member whereby the arm is rotatably supported for swinging movement between said posts and may be axially adjusted to bring its outer end into contact with said posts to center said center block relative to the particular brake drum, said arm having micrometer graduations on its outer end subject to being indexed from the center line of either of said gage posts to indicate the extent of turning of the arm about its own axis necessary to contact said posts in the centering of said center block, said adjustable gage block and said center arm and pivot member being removed from the gage after the centering of said center block and a bearing member centered on said center block and adapted to be mounted on the axle spindle whereby the gage may be swung around thereon to gage the brake shoes for the particular drum by bringing the post on said stationary block into gaging position relative to said shoes.

4. In a brake gage, a stationary gage block, a pair of spaced parallel guide rods having corresponding ends fixed to said block, an adjustable gage block slidably mounted on said rods, gage pins mounted on the undersides of said blocks with corresponding ends disposed to contact diametrically opposite points on the inner surface of the flange of a brake drum while said blocks rest on the outer edge of said flange, set screws for setting said adjustable block in adjusted positions, said blocks having vertical bores therein, upstanding gage posts adjustably mounted in said bores, said posts being spaced apart a distance equal to the distance between said ends of said pins, said posts being extensible below said blocks, means adjustably supporting said pins on said blocks whereby said pins may be adjusted so that said ends thereof will contact said posts when the latter are extended below the blocks, thereby to set said pins and posts in corresponding gaging positions after which the posts are extended above said pins, set screws for setting said posts above said pins, a center block slidable on said rods, means for releasably locking said center block in centered position on said rods, a gage arm, a pivot member rotatable on said center block and removable therefrom, said pivoted member having a screw threaded transverse bore, said gage arm being screw threaded and turned in said bore in said pivot member whereby the arm is rotatably supported for swinging movement between said posts and may be axially adjusted to bring its outer end into contact with said posts to center said center block relative to the particular brake drum, said arm having micrometer graduations on its outer end subject to being indexed from the center line of either of said gage posts to indicate the extent of turning of the arm about its own axis necessary to contact said posts in the centering of said center block, said adjustable gage block and said center arm and pivot member being removed from the gage after the centering of said center block and a bearing member centered on said center block and adapted to be mounted on the axle spindle whereby the gage may be swung around thereon to gage the brake shoes for the particular drum by bringing the post on said stationary block into gaging position relative to said shoes, there being a bearing disk on said pivot member seated on the upper end of the cup, and a pivot bearing in the bottom of said cup.

5. In a brake gage, a pair of parallel guide rods, a stationary gage block fixed to corresponding ends of said rods, an adjustable gage block slidable on said rods toward and away from said stationary block, gage pins on said blocks in diametrically opposed relation to one another having corresponding ends disposed to contact opposite points on the inner side of the flange of a brake drum while said blocks rest on said flange, an upstanding gage post carried by each of said blocks, said posts having their opposed surfaces spaced apart a distance equal to the distance between said ends of said pins, a center block slidable on said rods, means for releasably locking said center block in adjusted position, means for releasably locking said adjustable gage block in adjusted position, a bearing cup fixed on said center block, a gage arm and means rotatably supporting said arm in said cup for swinging movement between said posts, including means for axially adjusting said arm on the turning thereof about its own axis; said last named means and said arm being removable from the gage whereby said cup may be rotatably mounted on an axle spindle for moving said posts over the brake shoes to effect a proper setting of the shoes in accordance with the setting of the gage posts, lugs depending from said adjustable and stationary blocks and having screw threaded openings therein, said bearing pins being screw threaded and axially adjustable in said openings in said lugs, and means for locking said pins in adjusted position.

6. In a brake gage, a pair of parallel guide rods, a stationary gage block fixed to said rods, a slidable gage block slidably and removably mounted on said rods, gage points on said blocks disposed to contact opposite points on the inner surface of the particular brake drum under test to gage the diameter thereof, upstanding gage posts on said blocks spaced apart in correspondence to said gage points in all relative adjustments of said blocks, a centering block slidable on said rods, means for releasably locking said centering block in adjusted position, an arm swingably mounted on said centering block for movement to bring an end thereof into contact with said posts, means affording the axial adjustment of said rod relative to said centering block and bearing means on said centering block affording the application of the gage to an axle spindle whereby the gage may be rotated thereon to position at least one of said posts for gaging the shoes of the particular drum.

RAYMOND WARREN EPLER.

REFERENCES CITED

The following references are of record in the file of this patent:

UNITED STATES PATENTS

| Number | Name | Date |
|---|---|---|
| 1,965,843 | Kuhle | July 10, 1934 |
| 2,119,206 | Frisz | May 31, 1938 |
| 2,132,407 | Fowler | Oct. 11, 1938 |
| 2,268,354 | Thomason | Dec. 30, 1941 |

OTHER REFERENCES

Publication: "General Operating Instructions Wadell True Vision Brake and Drum Gauge," Wadell Engineering Co., Newark, N. J., Aug. 1, 1928.